(12) United States Patent
Sugawara (10) Patent No.: US 11,632,033 B2
(45) Date of Patent: Apr. 18, 2023

(54) SWITCHING CONTROL CIRCUIT AND POWER SUPPLY CIRCUIT

(71) Applicant: FUJI ELECTRIC CO., LTD., Kawasaki (JP)

(72) Inventor: Takato Sugawara, Matsumoto (JP)

(73) Assignee: FUJI ELECTRIC CO., LTD., Kawasaki (JP)

( * ) Notice: Subject to any disclaimer, the term of this patent is extended or adjusted under 35 U.S.C. 154(b) by 226 days.

(21) Appl. No.: 17/130,647

(22) Filed: Dec. 22, 2020

(65) Prior Publication Data

US 2021/0242766 A1 Aug. 5, 2021

(30) Foreign Application Priority Data

Feb. 4, 2020 (JP) .............................. JP2020-016837

(51) Int. Cl.
*H02M 1/08* (2006.01)
*H02M 3/335* (2006.01)

(52) U.S. Cl.
CPC .............. *H02M 1/08* (2013.01); *H02M 3/335* (2013.01)

(58) Field of Classification Search
CPC ...... H02M 1/08; H02M 3/335; H02M 1/0096; H02M 1/0006; H02M 1/322; H02M 3/33523; H02M 1/32
See application file for complete search history.

(56) References Cited

U.S. PATENT DOCUMENTS

| 5,999,429 A | 12/1999 | Brown | |
|---|---|---|---|
| 5,999,539 A | 12/1999 | Dashiff et al. | |
| 6,111,762 A * | 8/2000 | Igarashi | H02M 3/33523 363/21.16 |
| 6,515,876 B2 * | 2/2003 | Koike | H02M 3/33523 363/21.16 |
| 6,972,970 B2 * | 12/2005 | Yamada | H02M 3/33523 363/21.16 |
| 7,667,445 B2 * | 2/2010 | Hiasa | H02M 3/156 323/284 |
| 8,638,574 B2 * | 1/2014 | Sugawara | H02M 3/33523 363/21.13 |
| 11,411,499 B2 * | 8/2022 | Maruyama | H02M 1/08 |

* cited by examiner

*Primary Examiner* — Kyle J Moody
(74) *Attorney, Agent, or Firm* — Rabin & Berdo, P.C.

(57) ABSTRACT

A power supply circuit having a first capacitor, a transformer including a primary coil having a voltage of the first capacitor applied thereto, a secondary coil and an auxiliary coil, a second capacitor having a voltage from the auxiliary coil applied thereto, a transistor controlling an inductor current flowing through the primary coil, a control circuit outputting a first control signal when supply of the input voltage is unstopped, or is stopped yet a voltage of the second capacitor reaches a first level, and outputting a second control signal thereafter when the voltage of the second capacitor further reaches a second level, a first drive circuit outputting a first drive signal for switching control of the transistor in response to the first control signal, and a second drive circuit outputting a second drive signal for controlling on-resistance of the transistor to discharge the first capacitor, in response to the second control signal.

22 Claims, 7 Drawing Sheets

SWITCHING CONTROL CIRCUIT AND POWER SUPPLY CIRCUIT

CROSS-REFERENCE TO RELATED APPLICATION

The present application claims priority pursuant to 35 U.S.C. § 119 from Japanese patent application number 2020-016837 filed on Feb. 4, 2020, the entire disclosure of which is hereby incorporated by reference herein.

BACKGROUND

Technical Field

The present disclosure relates to a switching control circuit and a power supply circuit.

Description of the Related Art

An insulated power supply circuit, for example, comprises a transformer that includes a primary coil, a secondary coil, and an auxiliary coil, and the primary coil is configured to be applied with a rectified voltage obtained by rectifying an alternating-current voltage (AC voltage), and performs switching of a transistor that controls a current flowing through the primary coil, to generate an output voltage at a target level on a secondary side.

A control circuit that controls a transistor of such a power supply circuit may perform constant current control of the transistor to discharge a capacitor that smooths a rectified voltage, when the AC voltage is interrupted (for example, the description of U.S. Pat. No. 5,999,429).

Incidentally, the control circuit that controls the transistor of the power supply circuit generally operates using a voltage generated in the auxiliary coil as a power supply voltage. Accordingly, when the AC voltage is interrupted and the voltage generated in the auxiliary coil drops, the control circuit cannot operate. Then, if a charge remains accumulated in the capacitor, a person who repairs a power supply may receive an electric shock caused by the charge.

The present disclosure has been achieved in view of the above, and one or more aspects of the present disclosure are directed to a switching control circuit capable of discharging a capacitor appropriately when an input voltage is interrupted.

SUMMARY

A switching control circuit according to a first aspect of the present disclosure for controlling a power supply circuit that includes a first capacitor configured to smooth an input voltage of the power supply circuit, a transformer including a primary coil provided on a primary side thereof, a secondary coil provided on a secondary side thereof, and an auxiliary coil, the primary coil being configured to have a voltage of the first capacitor applied thereto, a second capacitor configured to have a voltage from the auxiliary coil applied thereto, and a transistor configured to control an inductor current flowing through the primary coil, the switching control circuit being configured to perform switching control of the transistor, the switching control circuit comprising: a control circuit configured to output a first control signal, when the input voltage is supplied to the power supply circuit, or when supply of the input voltage is stopped yet a first condition that a voltage of the second capacitor reaches a first level is satisfied, and output a second control signal, when the supply of the input voltage is stopped, the first condition is satisfied, and thereafter a second condition that the voltage of the second capacitor reaches a second level higher than the first level is satisfied; a first drive circuit configured to output a first drive signal for performing the switching control of the transistor, in response to the first control signal; and a second drive circuit configured to output a second drive signal for controlling on-resistance of the transistor to discharge the first capacitor, in response to the second control signal.

A switching control circuit according to a second aspect of the present disclosure for controlling a power supply circuit that includes a first capacitor configured to smooth an input voltage of the power supply circuit, a transformer including a primary coil provided on a primary side thereof, a secondary coil provided on a secondary side thereof, and an auxiliary coil, the primary coil being configured to have a voltage of the first capacitor applied thereto, a second capacitor configured to have a voltage from the auxiliary coil applied thereto, and a transistor configured to control an inductor current flowing through the primary coil, the switching control circuit being configured to perform switching control of the transistor, the switching control circuit comprising: a control circuit configured to output a first control signal when the input voltage is supplied to the power supply circuit, and output a second control signal when supply of the input voltage is stopped, a first drive circuit configured to output a first drive signal for performing the switching control of the transistor, in response to the first control signal, and a second drive circuit configured to output a second drive signal for controlling on-resistance of the transistor repeatedly to pass the inductor current intermittently to thereby discharge the first capacitor, in response to the second control signal.

A power supply circuit according to one aspect of the present disclosure comprising: a first capacitor configured to smooth an input voltage of the power supply circuit; a transformer including a primary coil provided on a primary side thereof, a secondary coil provided on a secondary side thereof, and an auxiliary coil, the primary coil being configured to have a voltage of the first capacitor applied thereto; a second capacitor configured to have a voltage from the auxiliary coil applied thereto; a transistor configured to control an inductor current flowing through the primary coil; a control circuit configured to output a first control signal, when the input voltage is supplied to the power supply circuit, or when supply of the input voltage is stopped yet a first condition that a voltage of the second capacitor reaches a first level is satisfied, and output a second control signal, when the supply of the input voltage is stopped, the first condition is satisfied, and thereafter a second condition that the voltage of the second capacitor reaches a second level higher than the first level is satisfied; a first drive circuit configured to output a first drive signal for performing switching control of the transistor, in response to the first control signal; and a second drive circuit configured to output a second drive signal for controlling on-resistance of the transistor to discharge the first capacitor, in response to the second control signal.

According to the present disclosure, it is possible to provide a switching control circuit capable of discharging a capacitor appropriately when an input voltage is interrupted.

DETAILED DESCRIPTION

At least following matters will become apparent from the description in the present specification and the accompanying drawings.

EMBODIMENT OF THE PRESENT DISCLOSURE

<Power Supply Circuit 10>

Figure 1:
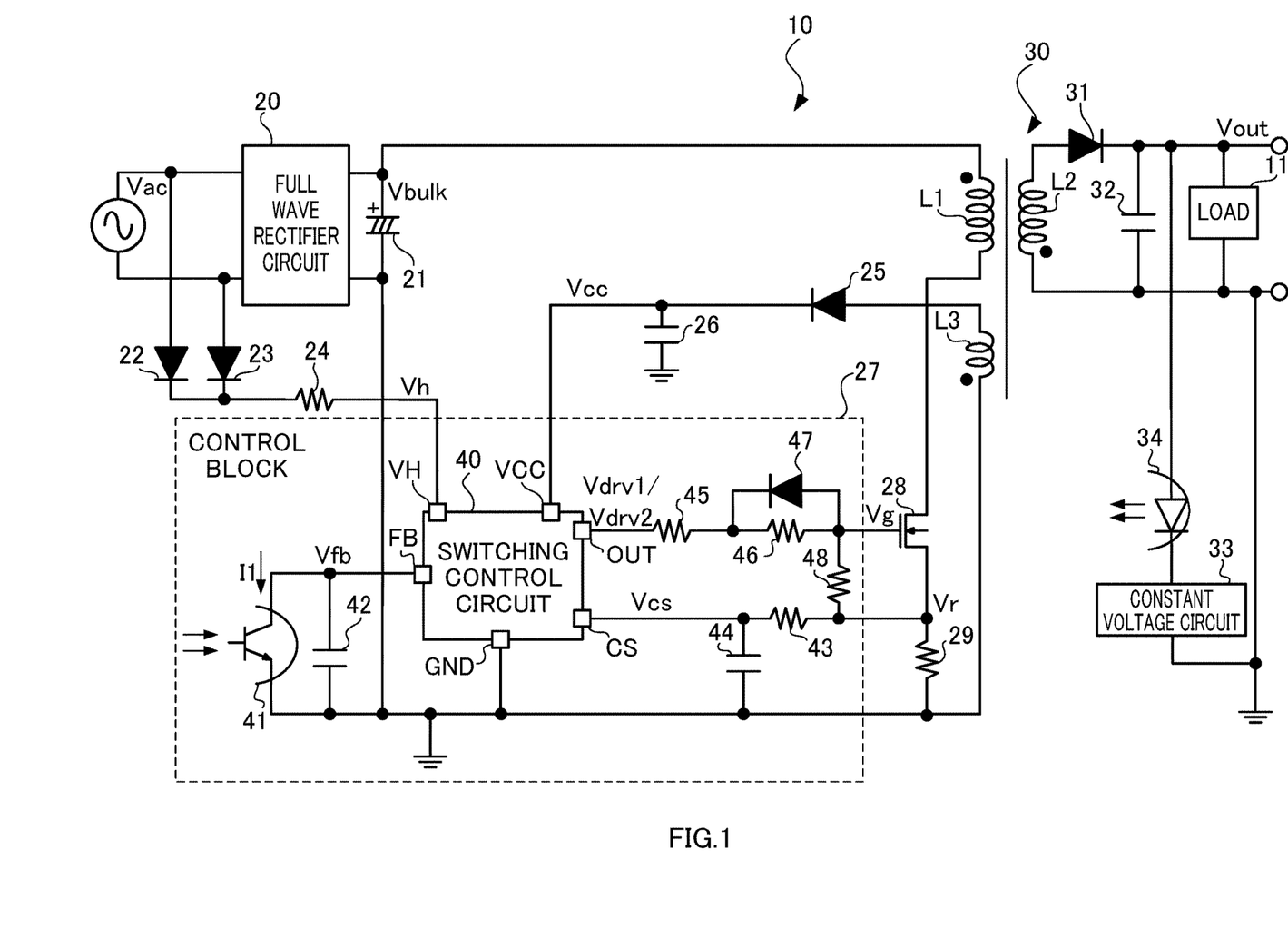
FIG. 1 is a diagram illustrating one example of a configuration of a power supply circuit 10.

FIG. 1 is a diagram illustrating one example of a configuration of a power supply circuit 10 according to one embodiment of the present disclosure. The power supply circuit 10 is a flyback power supply circuit that generates an output voltage Vout at a target level from an alternating-current voltage (AC voltage) Vac, which is an input voltage, and supplies the output voltage Vout to a load 11. The power supply circuit 10 comprises a full-wave rectifier circuit 20, capacitors 21, 26, and 32, diodes 22, 23, 25, and 31, resistors 24 and 29, a control block 27, an n-type metal-oxide-semiconductor (NMOS) transistor 28, a transformer 30, a constant voltage circuit 33, and a light-emitting diode 34.

The full-wave rectifier circuit 20 full-wave rectifies the applied AC voltage Vac, and applies a rectified voltage Vbulk to the capacitor 21. The capacitor 21 smooths the rectified voltage Vbulk from the full-wave rectifier circuit 20. Note that the capacitor 21 corresponds to a "first capacitor".

The transformer 30 is provided on the primary side, and comprises a primary coil L1 having one end connected to the full-wave rectifier circuit 20, a secondary coil L2 that is magnetically coupled to the primary coil L1 and is provided on the secondary side, and an auxiliary coil L3 magnetically coupled to the primary coil L1. Here, the secondary coil L2 is wound such that a voltage generated in the secondary coil L2 is opposite in polarity to a voltage generated in the primary coil L1. Accordingly, the output voltage Vout having a polarity opposite to the polarity in the primary coil L1 is generated in the secondary coil L2 in accordance with the ratio between the number of terns of the primary coil L1 and the number of terns of the secondary coil L2.

In addition, the auxiliary coil L3 is wound such that a voltage generated in the auxiliary coil L3 is opposite in polarity to the polarity of a voltage generated in the primary coil L1. Accordingly, an auxiliary coil voltage having a polarity opposite to the polarity in the primary coil L1 is generated in the auxiliary coil L3 in accordance with the ratio between the number of terns of the primary coil L1 and the number of terns of the auxiliary coil L3. Further, the diode 25 rectifies a current from the auxiliary coil L3 of the transformer 30, and supplies the rectified current to the capacitor 26. Thus, when switching of the NMOS transistor 28 is started, the capacitor 26 is charged with a current from the diode 25. In an embodiment of the present disclosure, the voltage of the capacitor 26 is hereinafter referred to as a voltage Vcc.

The NMOS transistor 28 is a device that controls power to be supplied to the load 11. The NMOS transistor 28 is controlled in response to a drive signal Vdrv1 or drive signal Vdrv2 output from a terminal OUT of a switching control circuit 40 which will be described later. As such, the NMOS transistor 28 changes an inductor current of the primary coil L1. Then, voltages generated in the secondary coil L2 and the auxiliary coil L3 change with a change in the inductor current of the primary coil L1. As a result, when the AC voltage Vac is supplied, the output voltage Vout at the target level is generated in the secondary coil L2, the auxiliary coil voltage is generated in the auxiliary coil L3, and the level of the voltage Vcc results in a predetermined voltage level Vcc norm, in an embodiment of the present disclosure.

Note that the NMOS transistor 28 corresponds to a "transistor", and the "transistor" is not limited to an NMOS transistor, but may be other semiconductor devices such as a bipolar transistor and the like. In addition, the capacitor 26 corresponds to a "second capacitor".

The resistor 29 is provided between the source terminal of the NMOS transistor 28 and the ground, and converts the inductor current of the primary coil L1 into a voltage Vr when the NMOS transistor 28 is turned on.

The diodes 22, 23 and the resistor 24 generate a voltage Vh, and are provided to detect the AC voltage Vac in association with an interruption detection circuit 52 in the switching control circuit 40 which will be described later.

The diode 31 rectifies a current from the secondary coil L2 of the transformer 30, and supplies a rectified current to the capacitor 32. The capacitor 32 is charged with a current from the diode 31, thereby generating the output voltage Vout across the terminals of the capacitor 32.

The constant voltage circuit 33 generates a constant direct-current voltage (DC voltage), and is configured using a shunt regulator, for example.

The light-emitting diode 34 is a device that emits light having an intensity corresponding to the difference between the output voltage Vout and the output of the constant voltage circuit 33, and constitutes a photocoupler together with a phototransistor 41 which will be described later. In an embodiment of the present disclosure, the intensity of the light from the light-emitting diode 34 increases as the level of the output voltage Vout rises.

<<Control Block 27>>

The control block 27 is a circuit that controls the NMOS transistor 28. The control block 27 comprises the switching control circuit 40, the phototransistor 41, capacitors 42, 44, and resistors 43, 45, 46, 48, and a diode 47.

The switching control circuit 40 has terminals VH, VCC, OUT, CS, FB, and GND. In addition, the voltage Vcc is applied to the terminal VCC, the voltage Vh for detecting the AC voltage Vac is applied to the terminal VH, and the terminal GND is connected to the ground.

The terminal FB is a terminal at which a feedback voltage Vfb corresponding to the output voltage Vout is generated, and is connected to the phototransistor 41 and the capacitor 42. The phototransistor 41 causes a bias current I1 having a magnitude corresponding to the intensity of the light emitted from the light-emitting diode 34 to flow from the terminal FB to the ground, and the capacitor 42 is provided to remove noise between the terminal FB and the ground. Accordingly, the phototransistor 41 operates as a transistor that generates a sink current.

The terminal CS is connected with the resistor 43 and the capacitor 44 that constitute a low-pass filter, and the low-pass filter generates a voltage Vcs obtained by reducing high-frequency noise of the voltage Vr.

The terminal OUT is connected with elements for changing the rising slope and falling slope of a gate voltage Vg of the NMOS transistor 28. Specifically, the terminal OUT is connected with the resistor 45, the resistor 46, and the diode 47, the resistor 46 having one end connected in series with the resistor 45 and the other end connected with the gate terminal of the NMOS transistor 28, the diode 47 having an anode connected to the gate terminal of the NMOS transistor 28 and a cathode connected to the resistor 45. As a result, the rising slope of the gate voltage Vg decreases, and the falling slope of the gate voltage Vg increases.

In addition, the resistor 48 is a resistor for pulling down the gate terminal of the NMOS transistor 28, and is connected to the ground via the resistor 29.

<Switching Control Circuit 40>

Figure 2:
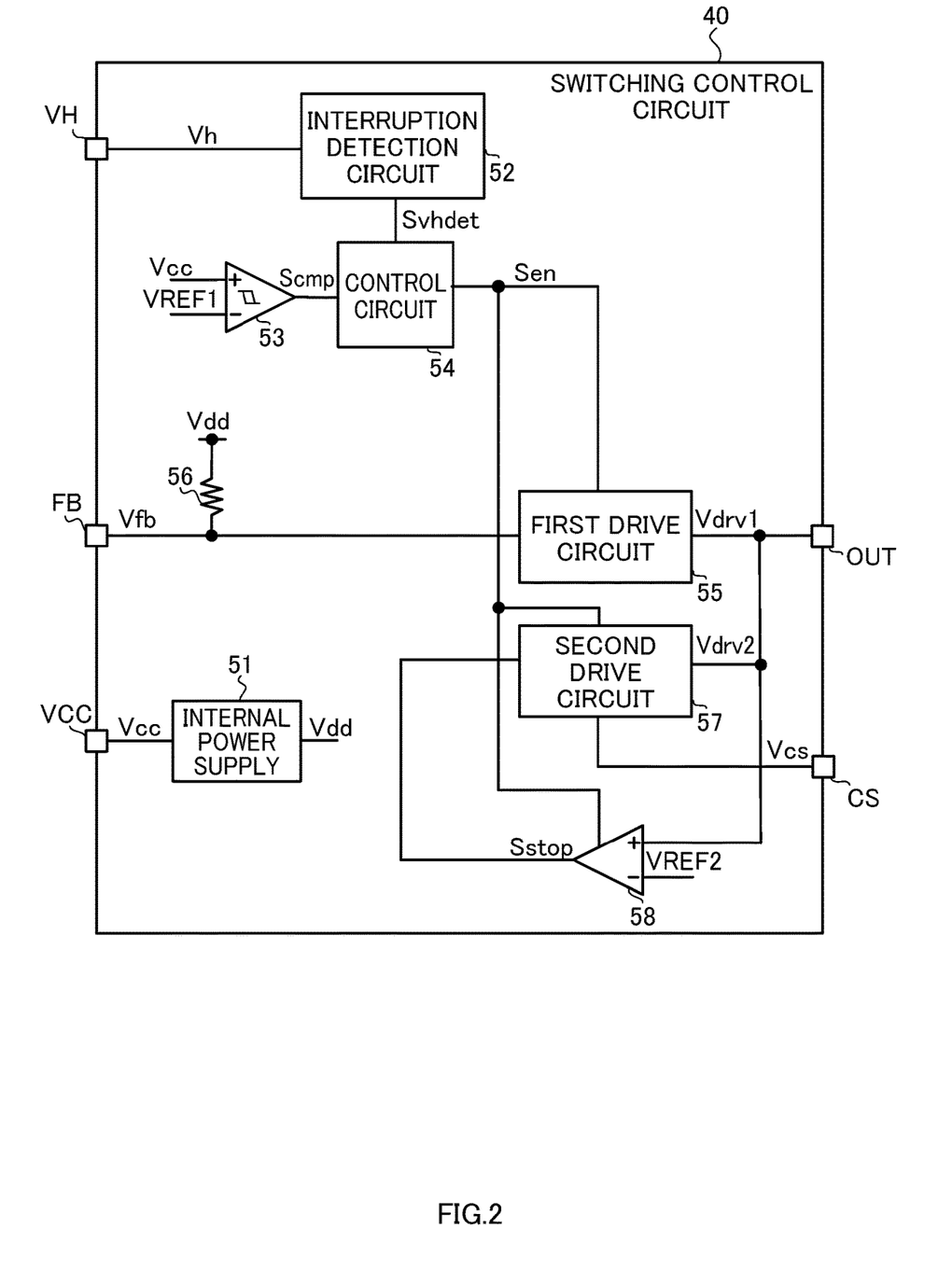
FIG. 2 is a diagram illustrating one example of a configuration of a switching control circuit 40.

FIG. 2 is a diagram illustrating one example of a configuration of the switching control circuit 40. Here, for convenience, the terminal GND is omitted. In addition, the voltage Vcc is used for generating a power supply voltage Vdd that is generated in an internal power supply 51 of the switching control circuit 40, and the voltage Vcc is also used for operating the switching control circuit 40.

The switching control circuit 40 outputs the drive signal Vdrv1/Vdrv2 for driving the NMOS transistor 28 in response to the voltages Vh, Vcc, Vfb, and Vcs.

The switching control circuit 40 comprises the internal power supply 51, the interruption detection circuit 52, a hysteresis comparator 53, a control circuit 54, a first drive circuit 55, a resistor 56, a second drive circuit 57, and a comparator 58. In addition, for example, the internal power supply 51, the first drive circuit 55, and the second drive circuit 57 are supplied with the voltage Vcc, and the internal power supply 51 generates the power supply voltage Vdd in response to the voltage Vcc.

The interruption detection circuit 52 detects the level of the AC voltage Vac in response to the voltage Vh. Specifically, the interruption detection circuit 52 outputs a signal Svhdet at a low level (hereinafter, referred to as low level or low) when the AC voltage Vac is supplied, and outputs the signal Svhdet at a high level (hereinafter, referred to as high level or high) when the AC voltage Vac is interrupted. Note that the interruption detection circuit 52 will be described later in detail.

The hysteresis comparator 53 is a circuit that compares the voltage Vcc with a threshold voltage VREFH, VREFL produced from a reference voltage VREF1, and outputs a signal Scmp. Specifically, the hysteresis comparator 53 changes the signal Scmp to high, when the voltage Vcc rises above the voltage VREFH which is a higher threshold voltage.

In contrast, the hysteresis comparator 53 changes the signal Scmp to low, when the voltage Vcc drops below the voltage VREFL (voltage VREFL<voltage VREFH) which is a lower threshold voltage. In an embodiment of the present disclosure, it is assumed that the level of the voltage VREFH which is the higher threshold voltage is lower than the predetermined voltage level Vcc norm. Note that the low level corresponds to a "first logic level", and the high level corresponds to a "second logic level".

The control circuit 54 outputs a control signal Sen for operating either the first drive circuit 55 or the second drive circuit 57, which will be described later, in response to the signals Svhdet and Scmp. Specifically, when the signal Svhdet is low, the control circuit 54 causes the control signal Sen to go high, and when the signal Svhdet goes high and a condition that the voltage Vcc reaches the voltage VREFL (hereinafter, referred to as a "first condition") is satisfied, the control circuit 54 causes the control signal Sen to go high. In contrast, after the first condition is satisfied, when a condition that the voltage Vcc reaches the voltage VREFH that is higher than the voltage VREFL (hereinafter, referred to as a "second condition") is satisfied, the control circuit 54 causes the control signal Sen to go low. In addition, when the supply of the AC voltage Vac is stopped under a condition that a state before satisfying the first condition is entered (hereinafter, referred to as a "third condition"), the control circuit 54 outputs the low control signal Sen.

Note that the control circuit 54 may be configured to output the high control signal Sen when the AC voltage Vac is supplied, and output the low control signal Sen when the supply of the AC voltage Vac is stopped.

Accordingly, when the control signal Sen is high, the first drive circuit 55, which will be described later, operates, and when the control signal Sen is low, the second drive circuit 57 and the comparator 58, which will be described later, operate. Note that the high control signal Sen corresponds to a "first control signal, the low control signal Sen corresponds to a "second control signal". In addition, the voltage VREFL corresponds to a "first level", and the voltage VREFH corresponds to a "second level".

The first drive circuit 55 outputs the drive signal Vdrv1 for performing switching control of the NMOS transistor 28 in response to the voltage Vfb when the control signal Sen is high. The voltage Vfb is a voltage dropped from the power supply voltage Vdd with the bias current I1 passed by the phototransistor 41 flowing through the resistor 56. The power supply voltage Vdd is a power supply voltage generated by the internal power supply 51 in the switching control circuit 40. The first drive circuit 55 will be described later in detail. Note that the drive signal Vdrv1 corresponds to a "first drive signal".

The second drive circuit 57 discharges the capacitor 21 with the inductor current passed by the NMOS transistor 28, when the control signal Sen is low. Specifically, the second drive circuit 57 outputs the drive signal Vdrv2 for controlling the on-resistance of the NMOS transistor 28 so as to discharge the capacitor 21, in response to a signal Sstop from the comparator 58, which will be described later, and the voltage Vcs. The second drive circuit 57 will be described later in detail. Note that the drive signal Vdrv2 corresponds to a "second drive signal".

The comparator 58 is a circuit that determines whether the discharge of the capacitor 21 is completed. Specifically, the comparator 58 is a circuit that, when the control signal Sen is low, compares the voltage of the drive signal Vdrv2 with a reference voltage VREF2, and outputs the signal Sstop for causing the second drive circuit 57 to stop outputting the drive signal Vdrv2 for driving the NMOS transistor 28. In addition, when the control signal Sen is low and the flowing inductor current reduces, the second drive circuit 57 raises the drive signal Vdrv2 above the reference voltage VREF2 and further pass the inductor current, to thereby raise the voltage Vcs. Accordingly, the comparator 58 outputs the high signal Sstop. In contrast, when the control signal Sen is high, the comparator 58 outputs the low signal Sstop. Note that the comparator 58 corresponds to a "determination circuit".

<Interruption Detection Circuit 52>

Figure 3:
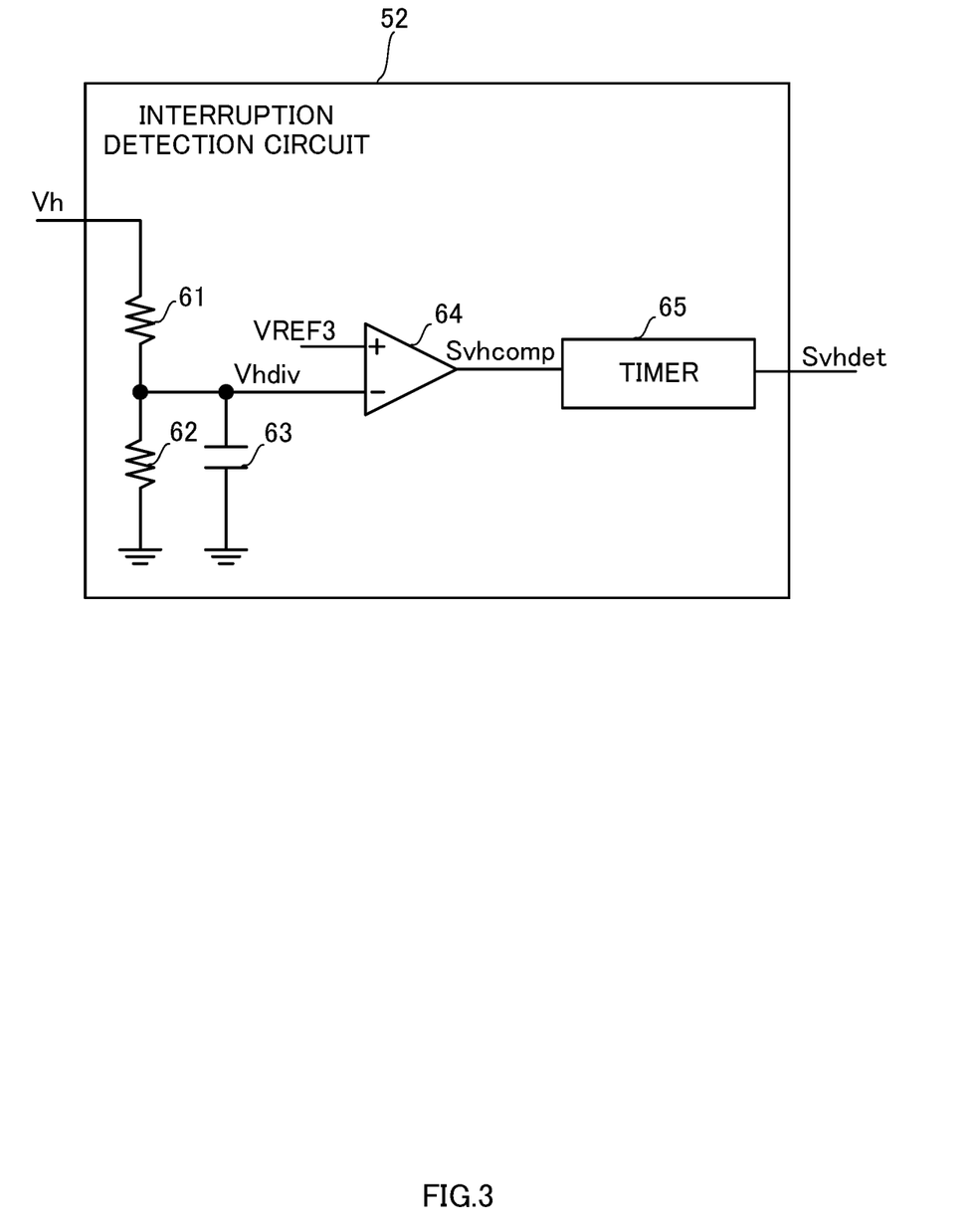
FIG. 3 is a diagram illustrating one example of a configuration of an interruption detection circuit 52.

FIG. 3 is a diagram illustrating one example of a configuration of the interruption detection circuit 52. The interruption detection circuit 52 compares a voltage Vhdiv obtained by dividing the voltage Vh with a reference voltage VREF3, to detect an interruption of the AC voltage Vac, and the interruption detection circuit 52 comprises resistors 61, 62, a capacitor 63, a comparator 64, and a timer 65.

Note that the "interruption" means, for example, that the AC voltage Vac is not supplied to the power supply circuit 10 and is not applied to the full-wave rectifier circuit 20.

The resistors 61 and 62 constitute a voltage divider circuit, and generate the voltage Vhdiv by dividing the voltage Vh so as to become lower than the voltage Vcc. The capacitor 63 smooths the voltage Vhdiv.

The comparator 64 compares the voltage Vhdiv with the reference voltage VREF3, and outputs a signal Svhcomp. Then, when the AC voltage Vac is supplied and the voltage Vhdiv is higher than the reference voltage VREF3, the comparator 64 outputs the low signal Svhcomp. In contrast, when the AC voltage Vac is interrupted and the voltage Vhdiv is lower than the reference voltage VREF3, the comparator 64 outputs the high signal Svhcomp.

The timer 65 outputs the high signal Svhdet, when a time period during which the signal Svhcomp is high is equal to or longer than a predetermined time period. In contrast, the timer 65 outputs the low signal Svhdet, when the signal Svhcomp is low or when the time period during which the signal Svhcomp is high is shorter than the predetermined time period.

<First Drive Circuit 55>

Figure 4:
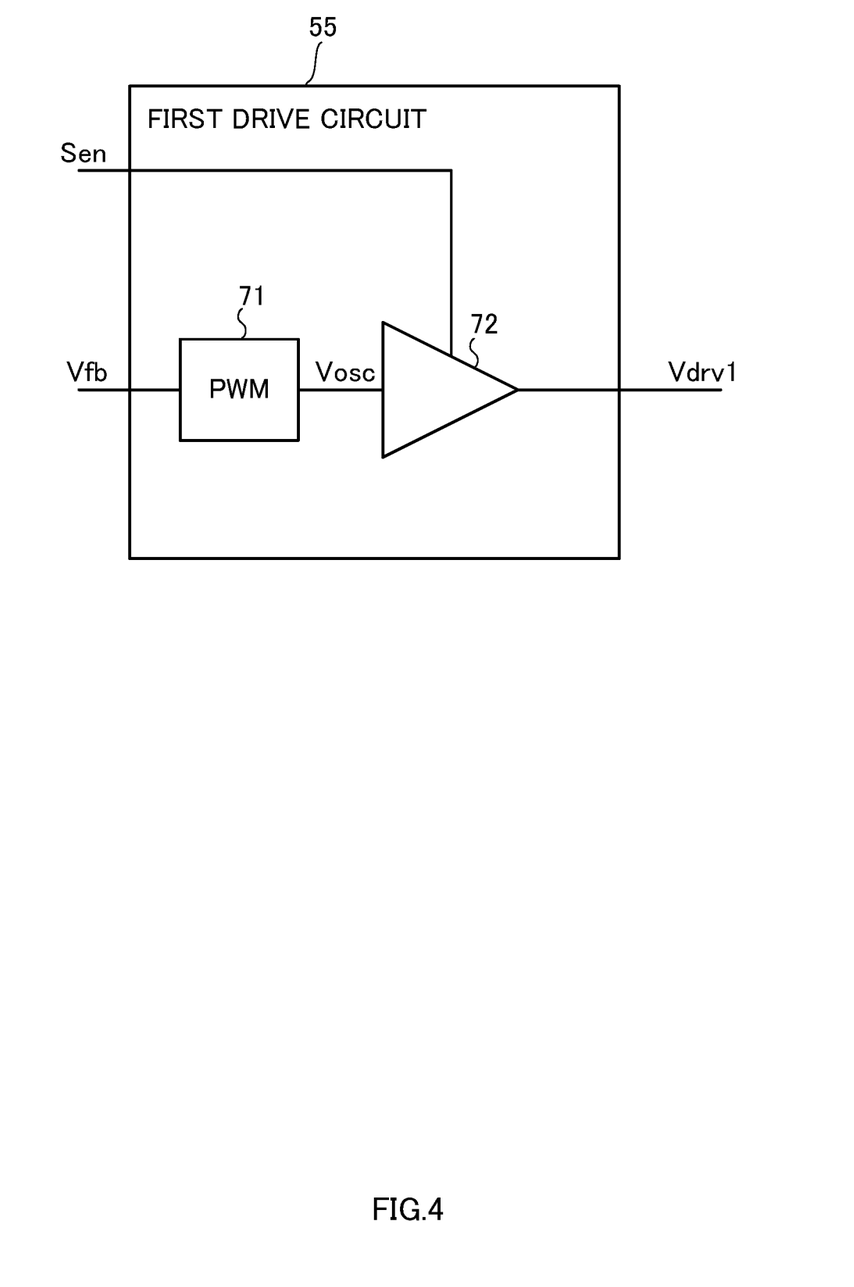
FIG. 4 is a diagram illustrating one example of a configuration of a first drive circuit 55.

FIG. 4 is a diagram illustrating one example of a configuration of the first drive circuit 55. The first drive circuit 55 outputs the drive signal Vdrv1 for performing switching control of the NMOS transistor 28 in response to the voltage Vfb, when the control signal Sen is high. In addition, the first drive circuit 55 comprises a PWM circuit 71, and a buffer 72.

The PWM circuit 71 compares the voltage Vfb input thereto with a reference voltage corresponding to the output voltage Vout at the target level, and outputs an oscillator signal Vosc for driving the NMOS transistor 28.

The operation of the PWM circuit 71 when the control signal Sen is high will be described below. The PWM circuit 71 outputs the oscillator signal Vosc for reducing a time period during which the NMOS transistor 28 is on, when the output voltage Vout is higher than the target level and the voltage Vfb is lower than the reference voltage corresponding to the output voltage Vout at the target level. As a result, the inductor current flowing through the primary coil L1 decreases, and the output voltage Vout drops.

In contrast, the PWM circuit 71 outputs the oscillator signal Vosc for increasing the time period during which the NMOS transistor 28 is on, when the output voltage Vout is lower than the target level and the voltage Vfb is higher than the reference voltage corresponding to the output voltage Vout at the target level. As a result, the inductor current flowing through the primary coil L1 increases, and the output voltage Vout rises.

In other words, the PWM circuit 71 outputs the oscillator signal Vosc for causing the output voltage Vout to achieve the target level.

The buffer 72 operates when the control signal Sen is high, and outputs the drive signal Vdrv1 having an amplitude corresponding to the voltage Vcc in response to the oscillator signal Vosc from the PWM circuit 71. In addition, the buffer 72 causes its output to be at a high impedance when the control signal Sen goes low.

<Second Drive Circuit 57>

Figure 5:
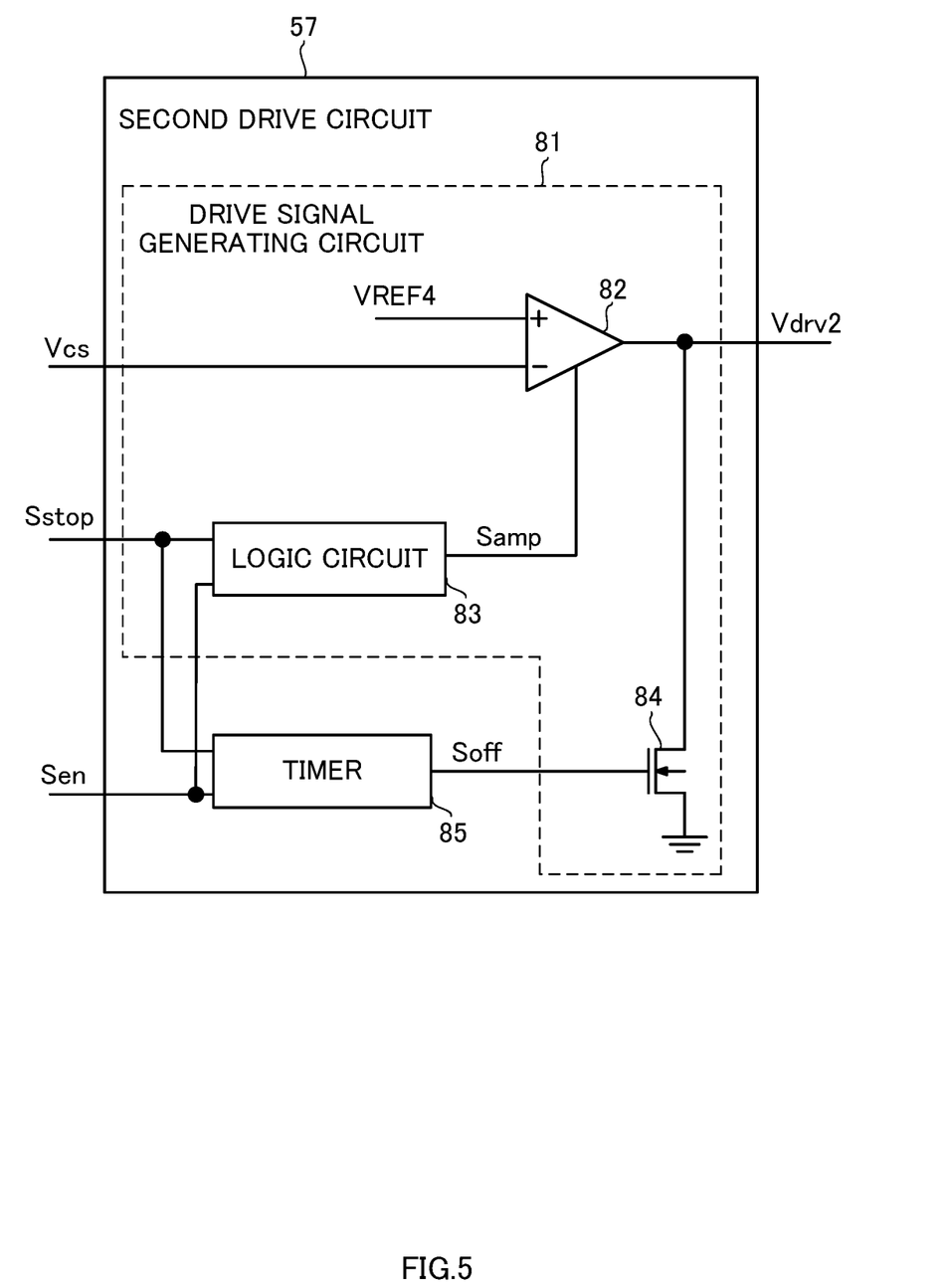
FIG. 5 is a diagram illustrating one example of a configuration of a second drive circuit 57.

FIG. 5 is a diagram illustrating one example of a configuration of the second drive circuit 57. The second drive circuit 57 discharges the capacitor 21 with the inductor current passed by the NMOS transistor 28. The second drive circuit 57 comprises a drive signal generating circuit 81 and a timer 85.

The drive signal generating circuit 81 generates the drive signal Vdrv2 for controlling the on-resistance of the NMOS transistor 28 so as to discharge the capacitor 21 in response to the signals Sstop and Soff and the voltage Vcs. The drive signal generating circuit 81 comprises an operational amplifier 82, a logic circuit 83, and an NMOS transistor 84.

The operational amplifier 82 generates the drive signal Vdrv2 for causing the inductor current passed through the NMOS transistor 28 to be a constant current in response to the voltage Vcs and a reference voltage VREF4. In addition, the operational amplifier 82 operates when a signal Samp from the logic circuit 83, which will be described later, is high. In contrast, the operational amplifier 82 does not operate when the signal Samp is low.

First, the operation of the operational amplifier 82 when the signal Samp is high will be described. The operational amplifier 82 has a non-inverting input terminal to which the reference voltage VREF4 is applied and an inverting input terminal to which the voltage Vcs corresponding to the inductor current flowing through the NMOS transistor 28 is applied.

As a result, the operational amplifier 82 generates the drive signal Vdrv2 for controlling the on-resistance of the NMOS transistor 28 to discharge the capacitor 21 so that the voltage Vcs at the inverting input terminal reaches the reference voltage VREF4 which is applied to the non-inverting input terminal. Thus, the operational amplifier 82 causes the inductor current to be at a predetermined value corresponding to the reference voltage VREF4.

Next, the operation of the operational amplifier 82 when the signal Samp goes low will be described. When the inductor current does not flow and the drive signal Vdrv2 becomes higher than the reference voltage VREF2, the signal Sstop goes high, and the logic circuit 83, which will be described later, outputs the low signal Samp. When the signal Samp goes low, the operational amplifier 82 does not operate. At this time, the operational amplifier 82 causes its output to be at a high impedance.

The logic circuit 83 outputs the signal Samp in response to signals Sen and Sstop. Specifically, the logic circuit 83 outputs the high signal Samp, when the control signal Sen is low and the signal Sstop is low. In contrast, the logic circuit 83 outputs the low signal Samp when the control signal Sen is high, or when the control signal Sen is low as well as the signal Sstop is high.

The NMOS transistor 84 causes the level of the drive signal Vdrv2 to be a ground voltage level in response to a signal Soff from the timer 85, which will be described later.

When the control signal Sen is low and the signal Sstop is low, the timer 85 measures time of a "predetermined cycle T0" repeatedly and changes the signal Soff. Specifically, the timer 85 outputs the low signal Soff during a "first time period P1" in the "predetermined cycle T0" or when the control signal Sen is high. At this time, the NMOS transistor 84 is turned off, and the drive signal generating circuit 81 generates the drive signal Vdrv2.

In contrast, the timer 85 outputs the high signal Soff during a "second time period P2" in the "predetermined cycle T0". At this time, the NMOS transistor 84 is turned on, and the NMOS transistor 84 causes the level of the drive signal Vdrv2 to be the ground voltage level. Then, when the signal Sstop goes high, the timer 85 causes the signal Soff to go high, thereby causing the level of the drive signal Vdrv2 to be the ground voltage level.

In other words, the drive signal generating circuit 81 generates the drive signal Vdrv2 for stopping the generation of the inductor current passed by the NMOS transistor 28. Note that the timer 85 corresponds to a "timer circuit".

Accordingly, the second drive circuit 57 controls the on-resistance of the NMOS transistor 28 in each "predetermined cycle T0" so that the inductor current flows intermittently, and outputs the drive signal Vdrv2 for discharging the capacitor 21.

<Operation of Switching Control Circuit 40>

Figure 6:
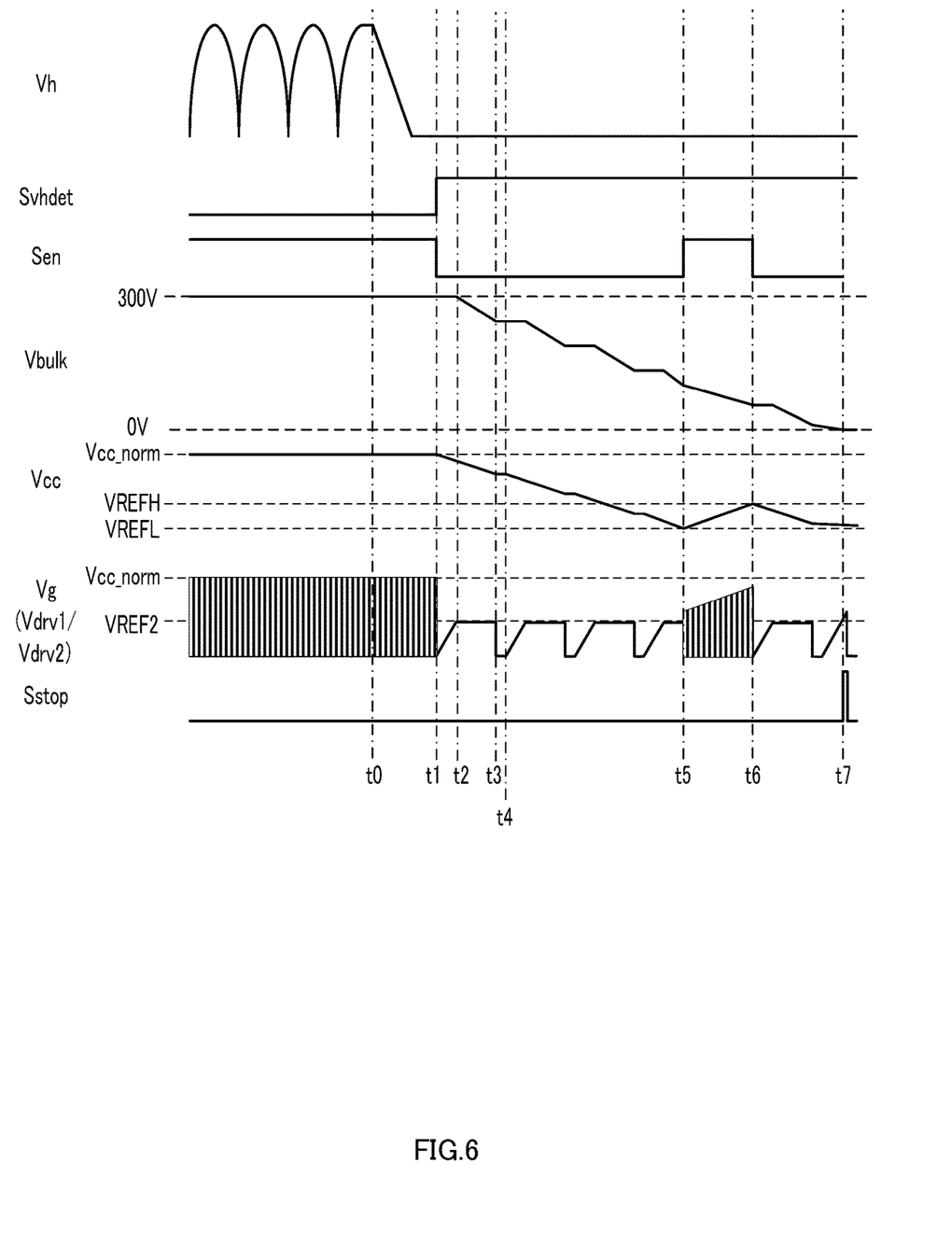
FIG. 6 is a diagram illustrating one example of an operation of a switching control circuit 40.

FIG. 6 is a diagram illustrating one example of an operation of the switching control circuit 40. The switching control circuit 40 outputs the drive signal Vdrv1/Vdrv2 for driving the NMOS transistor 28 in response to the voltages Vh, Vcc, Vfb, and Vcs.

Before and at time t0, the AC voltage Vac is supplied, the switching control circuit 40 outputs the drive signal Vdrv1 whose amplitude voltage level is the predetermined voltage level Vcc norm, and the power supply circuit 10 outputs the output voltage Vout at the target level.

At this time, the voltage Vbulk applied to the capacitor 21 is, for example, 300V, and the voltage Vcc applied to the capacitor 26 is the predetermined voltage level Vcc norm. In addition, since the AC voltage Vac is supplied, the interruption detection circuit 52 outputs the low signal Svhdet. The control circuit 54 causes the control signal Sen to go high. Then, at the time t0, the AC voltage Vac is interrupted.

After the time t0, the voltage Vh drops, and the voltage Vhdiv becomes lower than the reference voltage VREF3, and at time t1 at which a predetermined time period has elapsed, the interruption detection circuit 52 causes the signal Svhdet to go high. When the signal Svhdet goes high, the control circuit 54 causes the control signal Sen to go low. When the control signal Sen goes low, the first drive circuit 55 stops outputting the drive signal Vdrv1, and the second drive circuit 57 outputs the drive signal Vdrv2.

Figure 7:
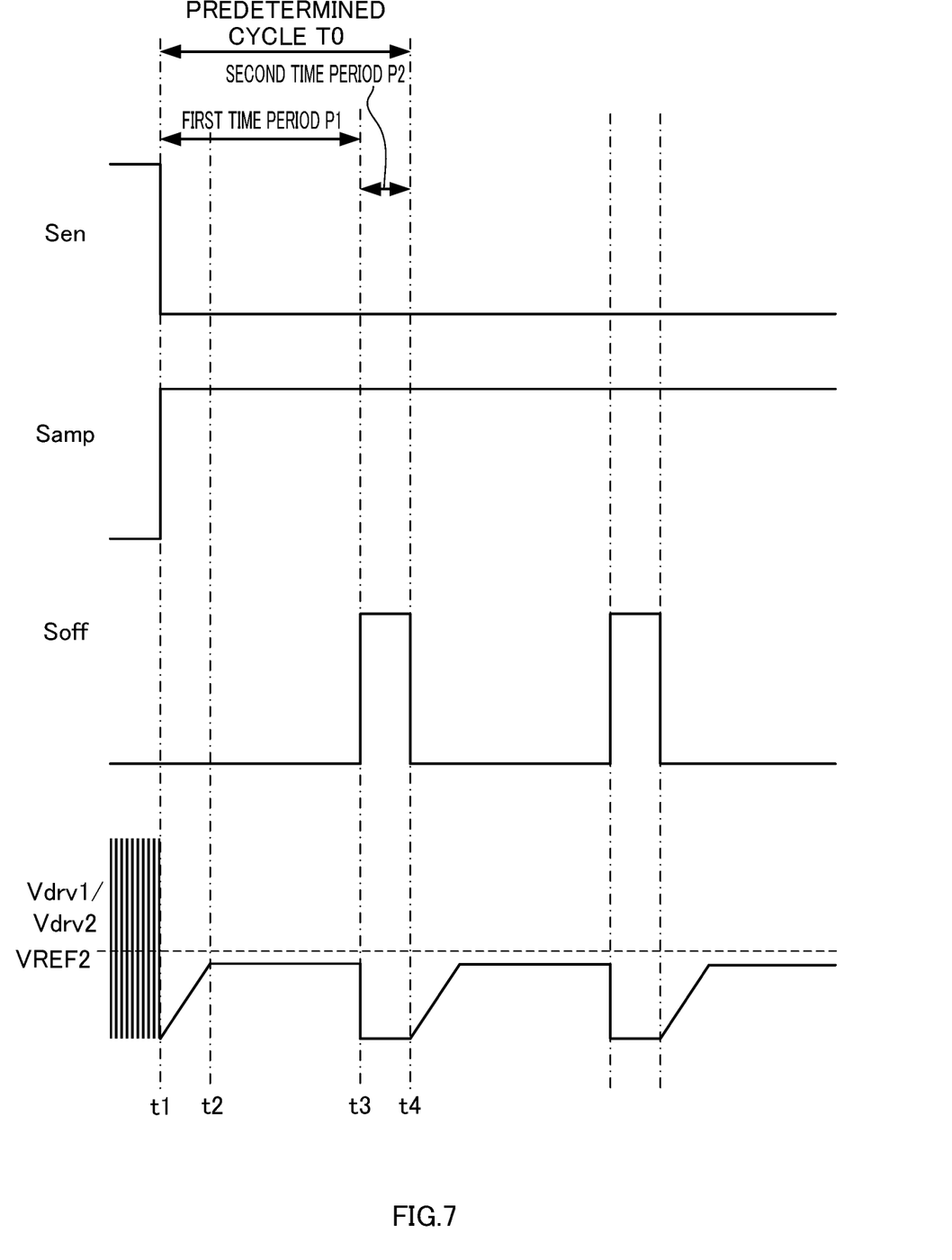
FIG. 7 is a diagram illustrating one example of an operation of a second drive circuit 57.

Here, first, the operation of the second drive circuit 57 during a time period from the time t1 to time t5 during which the capacitor 21 is discharged will be described with reference to FIG. 7.

At the time t1, the control signal Sen goes low, and the first drive circuit 55 stops outputting the drive signal Vdrv1, and the NMOS transistor 28 does not pass the inductor current, which is generated by a switching operation. When the control signal Sen goes low, the logic circuit 83 outputs the high signal Samp.

Then, the operational amplifier 82 starts outputting the drive signal Vdrv2, and the NMOS transistor 28 passes the inductor current for discharging the capacitor 21. When the control signal Sen goes low, the timer 85 starts measuring time of the "predetermined cycle T0", and the "first time period P1" starts. Then, the timer 85 causes the signal Soff to go low. In the "first time period P1", the operational amplifier 82 raises the drive signal Vdrv2 in order to pass the inductor current having a predetermined value through the NMOS transistor 28.

When the inductor current having the predetermined value corresponding to the reference voltage VREF4 flows through the NMOS transistor 28 at time t2, the voltage Vcs and the reference voltage VREF4 result in being substantially equal, and thus the operational amplifier 82 stops the rise of the drive signal Vdrv2. At this time, the level of the drive signal Vdrv2 is lower than the level of the reference voltage VREF2, which is the level of the drive signal Vdrv2 when the comparator 58 outputs the high signal Sstop.

At time t3, the "first time period P1" ends, and the "second time period P2" starts. At this time, the timer 85 causes the signal Soff to go high. When the signal Soff goes high, the NMOS transistor 84 is turned on, and the level of the drive signal Vdrv2 results in the ground voltage level.

At time t4 and thereafter, the operations from the time t1 to the time t4 are repeated. In other words, the NMOS transistor 28 passes the inductor current during the "first time period P1" in the "predetermined cycle T0", and the NMOS transistor 28 stops passing the inductor current during the "second time period P2".

Next, returning to FIG. 6, the description of the operation of the switching control circuit 40 will be resumed.

During a time period from the time t1 to the time t5, the switching control circuit 40 outputs the drive signal Vdrv2, and during this period, the inductor current of the predetermined value in the primary coil L1 causes the capacitor 21 to be discharged, and thus the voltage Vbulk drops. In addition, at this time, even though the switching operation of the NMOS transistor 28 is not performed and the auxiliary coil voltage is not generated, the switching control circuit 40 that operates using the voltage Vcc of the capacitor 26 operates. Thus, the voltage Vcc gradually drops.

When the signal Svhdet is high and the first condition that the voltage Vcc reaches the voltage VREFL is satisfied at the time t5, the control circuit 54 causes the control signal Sen to go high. When the control signal Sen goes high, the first drive circuit 55 of the switching control circuit 40 outputs the drive signal Vdrv1 having an amplitude of the voltage level of the voltage Vcc.

At this time, since the NMOS transistor 28 performs the switching operation in response to the drive signal Vdrv1, the inductor current flows, the capacitor 21 is discharged, and the voltage Vbulk drops. In addition, by the switching of the NMOS transistor 28, the auxiliary coil voltage is generated in the auxiliary coil L3, and the voltage Vcc applied to the capacitor 26 rises.

At time t6, after the first condition is satisfied, when the second condition that the voltage Vcc is higher than the voltage VREFH is satisfied, the control circuit 54 causes the control signal Sen to go low. At this time, the drive signal Vdrv1 is stopped and the drive signal Vdrv2 is output. When the control signal Sen goes low, the timer 85 starts measuring time of the "predetermined cycle T0".

When the voltage Vbulk reaches 0V at time t7, the inductor current does not flow. At this time, the operational amplifier 82 outputs the drive signal Vdrv2 higher than the reference voltage VREF2, and the comparator 58 outputs the high signal Sstop. As a result, the second drive circuit 57 causes the drive signal Vdrv2 to go low, to thereby stop passing the inductor current.

In addition, here, the description has been given assuming that when the signal Sstop goes high, the second drive circuit 57 causes the drive signal Vdrv2 to go low. However, the operational amplifier 82 in the second drive circuit 57 may stop outputting the drive signal Vdrv2, to maintain its output at a high impedance, and stop generation of the inductor current passed by the NMOS transistor 28.

In this case, the gate terminal of the NMOS transistor 28 is pulled down by the resistors 29 and 48, and the gate voltage Vg of the NMOS transistor 28 results in the ground voltage level. Note that the predetermined voltage level Vcc norm corresponds to a "third level".

Note that the switching frequency of the gate voltage Vg when the switching control circuit 40 performs a normal drive operation at and before the time t0 and the switching frequency of the gate voltage Vg at the time t5 to the time t6 are not particularly limited, but typically are about 20 to 200 kHz. On the other hand, the frequency of the intermittent operation of the inductor current during the discharge operation at the time t1 to the time t5 and the time t6 to the time t7 is not particularly limited, but typically is about 20 to 200 Hz. There is a large difference between this switching frequency and the frequency of the intermittent operation, basically a difference equal to or greater than 100 times, as described above, and typically a difference of about 500 to 2000 times. In other words, the switching frequency during the normal drive operation is equal to or greater than 100 times the frequency during the intermittent operation.

MODIFICATION EXAMPLES

An embodiment of the present disclosure has given an example in which the switching control circuit 40 is used for a flyback power supply circuit 10. However, it is not limited thereto, and the switching control circuit 40 may be used for a forward power supply circuit, an LLC resonant power supply circuit, or other insulated power supply circuits.

In addition, an embodiment of the present disclosure has described an example in which the switching control circuit 40 includes the interruption detection circuit 52 that detects the AC voltage Vac. However, a circuit that detects the AC voltage Vac using a photocoupler may be provided outside the switching control circuit 40.

In addition, an embodiment of the present disclosure has described an example in which the AC voltage Vac is full-wave rectified to generate the voltage Vh. However, the half-wave of the AC voltage Vac may be used to detect the interruption of the AC voltage Vac.

In addition, an embodiment of the present disclosure has described an example in which the second drive circuit causes the inductor current having the predetermined value corresponding to the reference voltage VREF4 to flow through the NMOS transistor 28. However, the inductor current of about such a magnitude as to avoid the NMOS transistor 28 from being destroyed may be passed, to reduce the discharge time of the capacitor 21.

In addition, an embodiment of the present disclosure has described an example in which the inductor current is intermittently passed to thereby discharge the capacitor 21 while the NMOS transistor 28 is protected. However, the inductor current constantly may flow through the NMOS transistor 28 during the operation of the second drive circuit 57.

SUMMARY

Hereinabove, the power supply circuit 10 according to an embodiment of the present disclosure has been described. The control circuit 54 outputs the control signal Sen. The first drive circuit 55 or the second drive circuit 57 then operates in response to the control signal Sen. As a result, when the voltage Vcc becomes lower than the lower threshold voltage VREFL of the hysteresis comparator 53, the NMOS transistor 28 performs switching, such that the auxiliary coil voltage is generated in the auxiliary coil L3, thereby being able to raise the voltage Vcc. Accordingly, the switching control circuit 40 continues operating. As a result, the switching control circuit 40 can discharge the capacitor 21 until the voltage Vbulk reaches 0V. In other words, it is possible to provide the switching control circuit 40 capable of appropriately discharging a capacitor when an input voltage is interrupted.

In addition, the second drive signal Vdrv2 is controlled such that the inductor current for discharging the capacitor 21 will be at the predetermined value, thereby being able to restrain the NMOS transistor 28 from being destroyed.

In addition, the control circuit 54 outputs the low control signal Sen, when the supply of the AC voltage Vac is stopped as well as before the first condition is satisfied. Accordingly, it is possible to discharge the capacitor 21 after the AC voltage Vac is interrupted.

In addition, the higher threshold voltage VREFH is set to be lower than the predetermined voltage level Vcc norm at the time when the output voltage Vout at the target level is generated, thereby being able to minimize the power supplied on the secondary side of the transformer 30 during the switching of the NMOS transistor 28.

In addition, circuits that detect the AC voltage Vac and the voltage Vcc, respectively, are provided, to control the first drive circuit 55 and the second drive circuit 57, thereby being able to operate the switching control circuit 40 until the discharge of the capacitor 21 is completed.

In addition, the on-resistance of the NMOS transistor 28 is controlled in a predetermined cycle, thereby being able to restrain the NMOS transistor 28 from being destroyed.

In addition, with the provision of the comparator 58 that detects completion of the discharge of the capacitor 21, the output of the drive signal Vdrv2 can be stopped after completion of the discharge of the capacitor 21.

In addition, when the voltage Vcc reaches the reference voltage VREFL and the first drive circuit 55 outputs the first drive signal Vdrv1, the capacitor 26 is charged and the voltage of the capacitor 26 rises. As a result, even if the charge of the capacitor 21 decreases, the switching control circuit 40 can continue discharging the capacitor 21 for a long time.

In addition, with the capacitor 26 being charged, the voltage Vcc rises above the higher reference voltage VREFH and the second condition is satisfied. As a result, the switching control circuit 40 can resume the operation of discharging the capacitor 21.

In addition, in order to discharge the capacitor 21, the switching control circuit 40 controls the on-resistance of the NMOS transistor 28 in each predetermined cycle, so as to intermittently pass the inductor current to discharge the capacitor 21, thereby restraining the NMOS transistor 28 from being destroyed.

In addition, with a difference between the switching frequency during the normal drive operation and the switching frequency during the discharging operation, the switching control circuit 40 can discharge the capacitor 21 while restraining an influence on the secondary side of the power supply circuit 10 during the discharging operation.

In addition, the switching control circuit 40 may be a single integrated circuit, but may also be configured with individual components in the power supply circuit 10.

In an embodiment of the present disclosure, the control circuit 54 uses the signal Scmp, which is a result of the comparison between the voltage Vcc and the voltage VREFH performed by the hysteresis comparator 53, to determine whether the second condition is satisfied. However, a configuration may be such that the control circuit 54 causes the control signal Sen to go low, when a predetermined time period has elapsed since the first condition has been satisfied. At this time, in place of the hysteresis comparator 53, a comparator for comparing a single reference voltage and the voltage Vcc can be used. In this case, the second condition will be such a condition that a predetermined time period has elapsed since the first condition has been satisfied.

Embodiments of the present disclosure described above are simply to facilitate the understanding of the present disclosure and are not in any way to be construed as limiting the present disclosure. The present disclosure may variously be changed or altered without departing from its essential features and encompass equivalents thereof.

What is claimed is:

1. A switching control circuit for controlling a power supply circuit that includes
   a first capacitor configured to smooth an input voltage of the power supply circuit,
   a transformer including a primary coil and an auxiliary coil, the primary coil being configured to have a voltage of the first capacitor applied thereto,
   a second capacitor configured to have a voltage from the auxiliary coil applied thereto, and
   a transistor configured to control an inductor current flowing through the primary coil,
the switching control circuit being configured to perform switching control of the transistor, the switching control circuit comprising:
   a control circuit configured to
      output a first control signal, when the input voltage is supplied to the power supply circuit, or when supply of the input voltage is stopped yet a first condition that a voltage of the second capacitor reaches a first level is satisfied, and
      output a second control signal, when the supply of the input voltage is stopped, the first condition is satisfied, and thereafter a second condition that the voltage of the second capacitor reaches a second level higher than the first level is satisfied;
   a first drive circuit configured to output a first drive signal for performing the switching control of the transistor, in response to the first control signal; and
   a second drive circuit configured to output a second drive signal for controlling on-resistance of the transistor to discharge the first capacitor, in response to the second control signal.

2. The switching control circuit according to claim 1, wherein
   the second drive circuit outputs the second drive signal to thereby cause the inductor current for discharging the first capacitor to be at a predetermined value.

3. The switching control circuit according to claim 1, wherein
   the second control signal is output, when the supply of the input voltage is stopped and a third condition that the voltage of the second capacitor has not decreased to the first level is satisfied.

4. The switching control circuit according to claim 3, wherein
   the voltage of the second capacitor is at a third level when the power supply circuit generates an output voltage at a target level, the third level being higher than the second level.

5. The switching control circuit according to claim 3, further comprising:
   an interruption detection circuit configured to detect that supply of an alternating-current (AC) voltage is stopped, when the input voltage is the AC voltage, and
   a hysteresis comparator configured to output a signal, which is
      at a first logic level when the voltage of the second capacitor becomes lower than the first level, and
      at a second logic level when the voltage of the second capacitor becomes higher than the second level.

6. The switching control circuit according to claim 2, wherein the second drive circuit includes
   a timer circuit configured to measure time of a predetermined cycle repeatedly, the predetermined cycle including a first time period and a second time period, and
   a drive signal generating circuit configured to generate the second drive signal
      to cause the inductor current to be at the predetermined value, during the first time period of the predetermined cycle, and
      to stop generation of the inductor current, during the second time period of the predetermined cycle.

7. The switching control circuit according to claim 2, further comprising:
   a determination circuit configured to determine whether discharge of the first capacitor is completed, wherein
   the second drive circuit stops generation of the inductor current when the determination circuit determines that the discharge of the first capacitor is completed.

8. The switching control circuit according to claim 1, wherein
   when the first drive circuit outputs the first drive signal in response to the first control signal under the first condition, the voltage of the second capacitor rises.

9. The switching control circuit according to claim 8, wherein
   the control circuit outputs the second control signal, when the voltage of the second capacitor rises under the first condition, to thereby cause the second condition to be satisfied.

10. A switching control circuit for controlling a power supply circuit that includes
   a first capacitor configured to smooth an input voltage of the power supply circuit,
   a transformer including a primary coil and an auxiliary coil, the primary coil being configured to have a voltage of the first capacitor applied thereto,
   a second capacitor configured to have a voltage from the auxiliary coil applied thereto, and
   a transistor configured to control an inductor current flowing through the primary coil,
the switching control circuit being configured to perform switching control of the transistor, the switching control circuit comprising:
   a control circuit configured to output a first control signal when the input voltage is supplied to the power supply circuit, and output a second control signal when supply of the input voltage is stopped,
   a first drive circuit configured to output a first drive signal for performing the switching control of the transistor, in response to the first control signal, and
   a second drive circuit configured to output a second drive signal for controlling on-resistance of the transistor repeatedly to pass the inductor current intermittently to thereby discharge the first capacitor, in response to the second control signal, wherein
   a switching frequency of the transistor is equal to or greater than 100 times of a frequency at which the inductor current is passed intermittently.

11. A power supply circuit comprising:
a first capacitor configured to smooth an input voltage of the power supply circuit;
a transformer including a primary coil and an auxiliary coil, the primary coil being configured to have a voltage of the first capacitor applied thereto;
a second capacitor configured to have a voltage from the auxiliary coil applied thereto;
a transistor configured to control an inductor current flowing through the primary coil;
a control circuit configured to
output a first control signal, when the input voltage is supplied to the power supply circuit, or when supply of the input voltage is stopped yet a first condition that a voltage of the second capacitor reaches a first level is satisfied, and
output a second control signal, when the supply of the input voltage is stopped, the first condition is satisfied, and thereafter a second condition that the voltage of the second capacitor reaches a second level higher than the first level is satisfied;
a first drive circuit configured to output a first drive signal for performing switching control of the transistor, in response to the first control signal; and
a second drive circuit configured to output a second drive signal for controlling on-resistance of the transistor to discharge the first capacitor, in response to the second control signal.

12. A switching control circuit for controlling a power supply circuit that includes
a first capacitor configured to smooth an input voltage of the power supply circuit,
a transformer including a primary coil and an auxiliary coil, the primary coil being configured to have a voltage of the first capacitor applied thereto,
a second capacitor configured to have a voltage from the auxiliary coil applied thereto, and
a transistor configured to control an inductor current flowing through the primary coil,
the switching control circuit being configured to perform switching control of the transistor, the switching control circuit comprising:
a control circuit configured to
output a first control signal, when the input voltage is supplied to the power supply circuit, and when supply of the input voltage is stopped yet a first condition that a voltage of the second capacitor reaches a first level is satisfied, and
output a second control signal, when the supply of the input voltage is stopped before the first condition is satisfied;
a first drive circuit configured to output a first drive signal for performing the switching control of the transistor, in response to the first control signal; and
a second drive circuit configured to output a second drive signal for controlling on-resistance of the transistor to discharge the first capacitor, in response to the second control signal.

13. The switching control circuit according to claim 12, wherein
the second drive circuit outputs the second drive signal to thereby cause the inductor current for discharging the first capacitor to be at a predetermined value.

14. The switching control circuit according to claim 12, wherein
the second control signal is output, when the supply of the input voltage is stopped and a third condition that the voltage of the second capacitor has not decreased to the first level is satisfied.

15. The switching control circuit according to claim 14, wherein
the voltage of the second capacitor is at a third level when the power supply circuit generates an output voltage at a target level, the third level being higher than the second level.

16. The switching control circuit according to claim 14, further comprising:
an interruption detection circuit configured to detect that supply of an alternating-current (AC) voltage is stopped, when the input voltage is the AC voltage, and
a hysteresis comparator configured to output a signal, which is
at a first logic level when the voltage of the second capacitor becomes lower than the first level, and
at a second logic level when the voltage of the second capacitor becomes higher than the second level.

17. The switching control circuit according to claim 13, wherein the second drive circuit includes
a timer circuit configured to measure time of a predetermined cycle repeatedly, the predetermined cycle including a first time period and a second time period, and
a drive signal generating circuit configured to generate the second drive signal
to cause the inductor current to be at the predetermined value, during the first time period of the predetermined cycle, and
to stop generation of the inductor current, during the second time period of the predetermined cycle.

18. The switching control circuit according to claim 13, further comprising:
a determination circuit configured to determine whether discharge of the first capacitor is completed, wherein
the second drive circuit stops generation of the inductor current when the determination circuit determines that the discharge of the first capacitor is completed.

19. The switching control circuit according to claim 12, wherein
when the first drive circuit outputs the first drive signal in response to the first control signal under the first condition, the voltage of the second capacitor rises.

20. The switching control circuit according to claim 19, wherein
the control circuit outputs the second control signal, when the voltage of the second capacitor rises under the first condition, to thereby cause the second condition to be satisfied.

21. A switching control circuit for controlling a power supply circuit that includes
a first capacitor configured to smooth an input voltage of the power supply circuit,
a transformer including a primary coil and an auxiliary coil, the primary coil being configured to have a voltage of the first capacitor applied thereto,
a second capacitor configured to have a voltage from the auxiliary coil applied thereto, and
a transistor configured to control an inductor current flowing through the primary coil, the switching control circuit being configured to perform switching control of the transistor, the switching control circuit comprising:
- an input interruption detection circuit which detects an interruption of the input voltage by sensing a rectified voltage of the input voltage and outputs a detection result signal of the interruption;
- a control circuit configured to output a first control signal in response to the detection result signal indicating that the input voltage is input to the power supply circuit, and output a second control signal in response to the detection result signal indicating that supply of the input voltage is stopped;
- a first drive circuit configured to output a first drive signal for performing the switching control of the transistor, in response to the first control signal; and
- a second drive circuit configured to output a second drive signal for controlling on-resistance of the transistor repeatedly to pass the inductor current intermittently to thereby discharge the first capacitor, in response to the second control signal.

22. The switching control circuit according to claim 21, wherein
- a switching frequency of the transistor is equal to or greater than 100 times of a frequency at which the inductor current is passed intermittently.

* * * * *